United States Patent [19]

Zibell et al.

[11] Patent Number: 5,221,543

[45] Date of Patent: * Jun. 22, 1993

[54] METHOD OF MAKING A FAST RELEASE STABILIZED ASPARTAME INGREDIENT FOR CHEWING GUM

[75] Inventors: Steven F. Zibell, Palo Heights; Mansukh M. Patel, Downers Grove; Jayant C. Dave, Bloomingdale; Robert A. Payne, Warrenville, all of Ill.

[73] Assignee: Firma Wilhelm Fette GmbH, Schwarzenbek, Fed. Rep. of Germany

[*] Notice: The portion of the term of this patent subsequent to Jun. 8, 2010 has been disclaimed.

[21] Appl. No.: 358,692

[22] Filed: May 26, 1989

Related U.S. Application Data

[63] Continuation-in-part of Ser. No. 205,495, Jun. 6, 1988, abandoned, and Ser. No. 134,948, Dec. 18, 1987, Pat. No. 4,863,745, which is a continuation-in-part of Ser. No. 921,754, Oct. 22, 1986, abandoned, said Ser. No. 205,495, is a continuation of Ser. No. 921,753, Nov. 22, 1986, abandoned.

[51] Int. Cl.⁵ .............................................. A23G 3/30
[52] U.S. Cl. .................................... 426/3; 426/285; 426/4; 426/5; 426/6; 426/548
[58] Field of Search ............................... 426/3–6, 426/548, 285

[56] References Cited

U.S. PATENT DOCUMENTS

| Re. 29,682 | 6/1978 | Cella et al. | 426/548 |
|---|---|---|---|
| 3,753,739 | 8/1973 | Cella et al. | |
| 3,922,354 | 11/1975 | Galluzzi et al. | 426/96 |
| 3,928,633 | 12/1975 | Shoaf et al. | 426/96 |
| 3,956,507 | 5/1976 | Shoaf et al. | 426/96 |
| 3,962,468 | 6/1976 | Pischke et al. | 426/96 |
| 4,004,039 | 1/1977 | Shoaf et al. | 426/548 |
| 4,059,706 | 11/1977 | Pischke et al. | 426/548 |
| 4,139,639 | 2/1979 | Bahoshy et al. | 426/3 |
| 4,230,687 | 10/1980 | Sair et al. | 424/22 |
| 4,384,004 | 5/1983 | Cea et al. | 426/3 |
| 4,384,005 | 5/1983 | McSweeney | 426/250 |
| 4,495,213 | 1/1985 | Wolf et al. | 426/548 |
| 4,497,835 | 2/1985 | Winston | 426/72 |
| 4,517,214 | 5/1985 | Shaaf et al. | 426/548 |
| 4,554,167 | 11/1985 | Sorge et al. | 426/285 |
| 4,556,565 | 12/1985 | Arima et al. | 426/3 |
| 4,568,560 | 2/1986 | Schobel | 426/3 |
| 4,579,747 | 4/1986 | Sugiyama et al. | 426/548 |
| 4,597,970 | 7/1986 | Sharma et al. | 426/5 |
| 4,634,593 | 11/1987 | Stroz et al. | 426/5 |

*Primary Examiner*—Joseph Golian
*Attorney, Agent, or Firm*—Michael J. Striker

[57] ABSTRACT

A process is disclosed for making a chewing gum with a fast release, stabilized chewing gum. According to the method, a quantity of aspartame (APM) is mixed with an agglomerating agent, such as a modified cellulose, and a limited quantity of a solvent for the agglomerating agent, such as water. The quantity of solvent is limited so as to produce a mixture which is only moist or damp. This damp mixture is characterized as being dust-free, non-flowing and crumbly. The damp mixture is then dried and the dried mixture is comminuted, e.g. by grinding, to produce particles of APM ingredient with essentially a maximum particle size of about 0.017 inches. These particles of APM ingredient are then added to a chewing gum formulation.

21 Claims, No Drawings

METHOD OF MAKING A FAST RELEASE STABILIZED ASPARTAME INGREDIENT FOR CHEWING GUM

CROSS-REFERENCE TO RELATED APPLICATION

This application is a continuation-in-part of co-pending application Ser. No. 205,495 filed by one of the present inventors on Jun. 6, 1988, now abandoned which is in turn a continuation of application Ser. No. 921,753 filed on Nov. 22, 1986, now abandoned. This application is also a continuation-in-part of application Ser. No. 134,948 filed by one of the present inventors on Dec. 18, 1987, now issued as U.S. Pat. No. 4,863,745, which in turn was a continuation-in-part of Ser. No. 921,754, filed Oct. 22, 1986, abandoned.

BACKGROUND OF THE INVENTION

The present invention relates to methods of producing a stabilized aspartame (APM) ingredient for chewing gum.

In recent years, effort has been devoted to increasing the stability of APM used in chewing gum. Many of these efforts have involved encapsulating or otherwise coating the APM with materials capable of protecting the APM within the chewing gum. Examples of methods used are spray drying, fluid bed coating and the like.

For example, U.S. Pat. No. 4,597,970 to Sharma et al., teaches a process for producing an agglomerated sweetener wherein the sweetener is dispersed in a hydrophobic matrix consisting essentially of lecithin, a glyceride, and a fatty acid or wax having a melting point between 25° and 100° C. The method disclosed uses a spray congealing step to form the sweetener-containing matrix into droplets followed by a fluid bed second coating on the agglomerated particles.

U.S. Pat. No. 4,139,639, to Bahoshy et al., teaches a process of "fixing" APM by co-drying (by spray or fluid bed drying) a solution containing APM and an encapsulating agent, such as gum arabic, to thereby surround and protect the APM during storage in the gum.

U.S. Pat. No. 4,384,004, to Cea et al., teaches a method of encapsulating APM with various solutions of encapsulating agents using various encapsulation techniques such as fluidized bed coating in order to increase the shelf-stability of the APM.

Naturally, the processes which use spray drying or fluid bed techniques for encapsulating the ingredients involve a relatively large investment in equipment and require skilled operating personnel and sophisticated process controls.

Also, such coating methods typically have, as a side effect, the reduction of the release rate of the APM from chewing gum. For many applications the reduction is a benefit in that it extends the time the gum is sweetened by the APM, thereby providing a chewing gum with extra long lasting sweetness.

In spite of the potential benefits in reducing the release rate of the APM, it may also be desirable to provide at least a portion of the APM in a particular chewing gum formulation in a form that has a relatively fast release rate. Typically this is desirable so that the consumer experiences the proper sweetness during initial chewing, i.e. "up front sweetness".

SUMMARY OF THE INVENTION

The present invention is directed to methods for producing a fast release stabilized APM ingredient for chewing gum, that is, an APM ingredient which has increased stability while yet retaining an acceptably fast release rate.

Briefly stated, the methods of the present invention generally comprise the following steps A quantity of uncoated APM is mixed with an agglomerating agent, such as a modified cellulose, and a limited quantity of a solvent, such as water. The quantity of solvent is limited to that amount which will produce a mixture which is only damp or moist. This damp mixture is characterized as being dust-free, non-flowing and crumbly. The damp mixture is then dried. The dried mixture is comminuted, e.g. by grinding, to produce fine particles of aspartame ingredient. These particles will essentially have a maximum particle size of 0.017 inches. These particles are then added to a chewing gum formulation without a further coating.

By the term "essentially having a maximum particle size of 0.017 inches" it is meant that at least 95 percent of the particles will pass through a U.S. standard number 40 or Tyler number 35 sieve which have a mesh size of 0.0165 inches. It is acceptable that a small percentage, as much as 5% by weight, of the parties particles will be larger than this and will be retained on the U.S. standard 40 sieve during sieve analysis.

It is also noted that the phrase "fast release" as used in this specification and appended claims is intended to refer to APM ingredients which have a release rate faster than that of APM treated by conventional coating processes. Typically, this fast release APM would refer to the portion of APM intended to be released first from the chewing gum, i.e. the APM included in the chewing gum formulation for up front sweetness.

In accord with one preferred embodiment of the present invention the agglomerating agent is hydroxypropyl methylcellulose (HPMC). The APM is dry blended with the HPMC in an amount so as to comprise about 15 percent HPMC by weight of the agglomerated APM. The mixing is accomplished in a planetary or other type mixer which affects compressive forces between the components. Water is added to the dry blend in small increments while mixing until it is present in an amount of about 36 percent of the damp mixture The damp mixture is spread out on trays and dried at about 170° F. for 12 to 14 hours. After drying, the mixture preferably has between 2 and 3 weight percent water. The dried mixture is then ground in a high speed grinder with a 0.027 inch screen.

It is preferred that, in addition to meeting the above maximum size criteria, the particles include a quantity of even smaller particles, namely smaller than 0.0029 inches. Such particles will pass through a U.S. standard number 200 (Tyler number 200) sieve. It is preferred that at least 20% by weight of the particles will be this small.

In formulating the chewing gums of the present invention, it is also preferable to use the fast release products of the present invention in combination with APM encapsulations or treatments which produce a slow release during chewing By blending of these APM ingredients with selected release rates, it is possible to produce stable chewing gums which have both a strong initial sweetness and also a milder but longer lasting sweetness. In a less preferred embodiment, the fast release APM ingredient may be the only APM in the chewing gum. In an even less preferred embodiment, the chewing gum formulation also includes untreated APM in addition to the stabilized fast release APM ingredient of the present invention.

The present invention offers advantages in that it provides a relatively simple and inexpensive method for treating APM to produce a fast release, yet stable APM ingredient for chewing gum. In particular, it was a surprising result that the inventive process produces agglomerated APM ingredients with acceptably fast release profiles while still providing protection against degradation, which protection is comparable to APM treated by conventional coating processes.

It was also somewhat surprising that the APM ingredient of the present invention maintained this level of protection even at such a small particle size.

It is a further advantage that the method of the present invention can be carried out in a relatively short time and using relatively simple equipment. Moreover, although the present invention may be carried out in a continuous process, it is also well suited for batch processes. This is particularly important in view of the small quantities of APM typically used.

These and other advantages of the present invention will become apparent from the following description of the preferred embodiments which, when taken in conjunction with the accompanying examples, discloses presently preferred methods of the present invention.

DETAILED DESCRIPTION OF THE PREFERRED EMBODIMENTS

As the first step in the preferred embodiment, a quantity of powdered APM is mixed with a quantity of powdered agglomerating agent.

The aspartame used is obtained from the G. D. Searle Company under their designation "NutraSweet ®." This is a powdered form with generally needle shaped crystals having a wide range of particle sizes Generally, this powder is considered difficult to work with because of its poor flowability and low bulk density. In particular, it is relatively difficult to coat these individual APM crystals because of their small size and needle-like shape.

The powdered agglomerating agent may be selected from a wide variety of agglomerating agents. Examples of preferred agglomerating agents include modified cellulose compounds, such as hydroxypropyl methylcellulose (HPMC); shellac; alcohol soluble proteins, such as zein; carbohydrate syrups; polymers, such as polyolefins, polyesters, polyvinyl acetate; etc. Plasticizers and conditioners for the agglomerating agents can also be used.

Modified cellulose compounds are preferred with HPMC being used in the most preferred embodiment. The HPMC used in the most preferred embodiment can be obtained from the Dow Chemical Company from their METHOCEL line under the specific designation "E4M."

The present invention also contemplates the simultaneous use of more than one agglomerating agent. For example, two or more different types or grades of HPMC could be blended so as to modify the properties of the agent as a whole. In addition, it may be desirable to use two or more agglomerating agents which have different solubility properties to thereby produce a stepped release of the product when used.

The present invention further contemplates the use of more than one agglomerating step whereby more than one layer of agglomerating agent can be applied to the clusters of agglomerated APM particles. Depending on the results desired, it may be desirable to use either the same or different agglomerating agents in each of the layers.

The relative proportion of agglomerating agent to APM depends on the specific agglomerating agent selected and the degree of stabilization required. Generally, using more agglomerating agent will result in an improved protection but possibly also slower release of the ingredient when the gum is chewed.

Naturally, the amount of agglomerating agent should be kept below the level at which it would adversely affect the flavor or texture of the chewing gum. Preferably, the agglomerating agent will comprise between about 1 and about 65 weight percent of the agglomerated ingredient, i.e. percent by combined weight of the APM and the agglomerating agent. In the most preferred embodiment, the HPMC is added to between about 5 and about 50 percent by weight of the agglomerated ingredient, even more preferably between about 10 and about 30 percent.

Preferably, the APM and agglomerating agent are well blended in their dry form before any addition of solvent. In the most preferred embodiment, this is accomplished by simply adding the two powdered components to a mixer bowl of a planetary type mixer. The mixer is activated for a time sufficient to thoroughly intermix the two powders. This dry blending of the APM and the agglomerating agent is thought to be desirable in that the two components are thus uniformly dispersed in one another prior to the addition of the limited quantity of solvent, thereby providing for more uniform dispersion during the solvent addition and in the final agglomerated product.

In alternative embodiments, the solvent may be added to the agglomerating agent before it is added to the APM. For example, a carbohydrate syrup can be used in the present process and thus act as both the agglomerating agent and the solvent. Other agglomerating agents can likewise be pre-mixed with their solvent before being added to the APM. For example, shellac is preferably used with an ethanol solvent already present.

In other alternative embodiments, the solvent may be added to the APM before the agglomerating agent is added.

Referring again to the preferred embodiment, after the APM and dry agglomerating agent are thoroughly mixed, a solvent, i.e. a solvent for the agglomerating agent and/or the ingredient, is added to the mix. Naturally, the selection of solvent will depend on the selection of the agglomerating agent. When using HPMC in the preferred embodiment, the preferred solvent is water. When using shellac or zein as the agglomerating agent, the preferred solvent is ethanol, although zein may be agglomerated using alkaline water with a pH of 11.4 to 11.8. Certainly, it is important to avoid solvents which would be unsafe for use in making food products.

The total amount of solvent added will also depend on the selection of the agglomerating agent. As stated, the amount of solvent is intentionally limited so as to produce a damp, dust-free, non-flowable, non-extrudable, crumbly mixture. By the word "crumbly" it is meant that the damp mix easily separates from itself. By way of comparison, the damp mix should have the consistency and texture of wet sand. By way of contrast, the damp mix should not have so much solvent that it becomes dough-like, paste-like, clay-like, or soup-like. It has been found that, if the mix does go to the dough-like stage, many of the advantages of the present invention are lost. In particular, the dough-like mix is more difficult to mix, handle, and dry and considerably more difficult to achieve the desired particle sizes.

The preferred method of adding the solvent to the mix is to add it in small amounts in time spaced increments while continuously mixing. When adding the solvent this way, it is desirable to allow the mix to become homogeneous before the next addition of solvent. In following this preferred method, the solvent is allowed to be absorbed slowly into the mixture without producing pools of solvent which can result in large clay-like lumps in the mixture.

It has been found that one method of determining when there is sufficient solvent added is to monitor the power demand for the mixer. In particular, the power demand increases dramatically as the mix goes from the desired damp mix stage to a dough-like stage. This is believed to be due to the fact that, in the desired damp mix stage, the mix is crumbly, i.e. easily separable; whereas when the mix moves into the clay-like stage, the mix become more cohesive. As a result, the power demand on the mixer can be monitored and the solvent addition stopped just as the power demand begins a sharp rise.

It is also possible to determine the proper amount of solvent by visually monitoring the condition of the damp mix. The characteristics mentioned above, namely dust-free, non-flowable, and crumbly, are relatively easy to observe and contrast with the cohesiveness, and flowability of the dough-like stage.

Naturally, once the optimum amount of solvent is determined for a particular agglomerating agent and a particular weight ratio of agglomerating agent to APM, that optimum amount will be reproducible.

In the most preferred embodiment, wherein APM is agglomerated with HPMC, the water is added so as to comprise between about 20 and about 55 percent by weight of the damp mix, more preferably between about 30 and about 40 percent, and most preferably about 37 percent. When zein is used to agglomerate APM, ethanol is most preferably present in an amount between about 25 and about 50 percent by weight of the damp mix. Likewise, when pre-solvated shellac is used to agglomerate APM, ethanol is preferably present in an amount between about 7 and about 15 percent by weight of the damp mix.

After the last of the solvent is added, the combination is continuously mixed for a time sufficient to allow for a homogenous mass. In particular, the solvated and unsolvated APM, the solvated and unsolvated agglomerating agent, and any free solvent should all be evenly dispersed in the mix. The optimum time of mixing can be determined visually.

The type of mixing affected on the mix is believed to be important to the present invention. In particular, it is believed that a compressive type mixing is important in order to push the solvated agglomerating agent and the particles of APM together into clusters. This is contrasted with a high shear type mixing which would act to separate the components of the damp mix. Accordingly, the preferred type of mixer is a planetary mixer or other type mixer that would give similarly compressive type mixing.

After the final mixing, the damp mix is dried. Preferably, substantially all of the solvent will be removed from the mix. The drying is preferably accomplished by taking the damp mix out of the mixer bowl and spreading it on drying trays. It been found preferable to line the drying trays with paper to facilitate removal of the dried product. In the most preferred embodiment, the damp mix is spread on trays at a depth of about 2 cm.

Preferably, the drying is accomplished by placing the trays in a drying oven at a temperature and for a time sufficient to drive off substantially all of the solvent. Naturally, the temperature and time for drying will depend on the specific solvent and amount of solvent used. It is desirable to use the minimum temperature and time necessary for this purpose in order to reduce or eliminate degradation of APM during drying. Accordingly, it may be desirable to allow the damp mix to dry at ambient conditions. In the most preferred embodiment, the APM agglomerated with HPMC is dried at about 170° F. for 12 to 14 hours.

Another factor which can influence the temperature of drying, is whether it is desired to have the solvent boil as it leaves the particles. It is known in the art that, if the solvent boils during drying, the coating left on the particles has a tendency to be porous due to bubbling. This porousness may further increase the release rate of APM during chewing.

After drying in the most preferred embodiment, the agglomerated APM has been found to have a water content of between about 2 and 3 percent by weight of the total. The acceptable level of solvent left in the agglomerated ingredient particles may be higher or lower than this amount and will depend on the nature of the solvent and agglomerating agent used.

After drying, the mix is generally characterized as being in the form of hard, dry lumps of various shapes and sizes. At this point, the dry mix is ready to be treated to produce the desired range of particle sizes. This can be accomplished in various ways. Preferably, the dried mix is fed into a grinder which comminutes the mix into smaller particles. Other devices such as a roller mill can also be used to comminute the dried mix. The grinder or other device is preferably equipped with a screen which will pass the desired particle size range. If desired, other techniques such as a second screen or a cyclone separator can be used to ensure a minimum particle size as well as a maximum particle size.

In the most preferred embodiment, the agglomerated material is first ground through a 0.05 inch screen to produce a relatively uniform coarse material, see Comparative Example 1 below. In this embodiment, the coarse matter is then reground using a 0.027 inch screen to produce the finely ground particles of the present invention.

As stated above, the fast release stabilized APM of the present invention should essentially have a maximum particle size of 0.017 inches. By this it is meant that at least 95 percent of the particles will pass through a U.S. standard number 40 or Tyler number 35 sieve which have a mesh size of 0.0165 inches. As much as 5% by weight, of the parties particles can be larger than this and will be retained on the U.S. standard 40 sieve during sieve analysis. Preferably, no more than about 2 percent by weight of the particles will have a particle size of 0.017 inches or greater.

It is preferred that, in addition to meeting the above maximum size criteria, the particles include a quantity of even smaller particles, namely smaller than 0.0029 inches. Such particles will pass through a U.S. standard number 200 (Tyler number 200) sieve. It is preferred that at least 20% by weight of the particles will be this small.

In the practice of the invention, the ground product may include APM crystals which are not bonded to others. These unbonded crystals may have missed being bonded during the agglomerating process or they may have become disattached from clusters during the grinding process.

In the most preferred embodiment, only the maximum particle size is controlled. That is, the smaller particles are not held back. As a result there are small unbonded crystals in addition to the clusters. This produces the effect of allowing some smaller and/or unbonded particles of the APM to be released more quickly when the gum is chewed than the APM which is bound in the clusters. As a result, the release profile is such that the consumer experiences a satisfactory initial sweetness.

At this point, the above-described fast release stabilized APM is ready to be incorporated into a chewing gum. Preferably, the fast release stabilized APM ingredient is added at a level between about 0.02 and about 0.6 percent by weight of the chewing gum formulation, most preferably between about 0.05 and about 0.3 percent. The exact usage level will depend on at least the following factors: the desired sweetness of the gum, the presence or absence of other forms of APM, and the active APM concentration of the APM ingredients.

In formulating the chewing gums of the present invention, it is presently preferred to use the fast release products of the present invention in combination with APM encapsulations or treatments which produce a slow release during chewing. By blending of these APM ingredients with selected release rates, it is possible to produce stable chewing gums which have both a strong initial sweetness and also a milder but longer lasting sweetness.

Alternatively, the fast release APM ingredient may be the only APM in the chewing gum. Also, although not preferred, the chewing gum formulation can also include untreated APM in addition to the stabilized fast release APM ingredient of the present invention.

The rest of the chewing gum ingredients are seen to be noncritical to the present invention. That is, the particles of APM ingredient can be incorporated into conventional chewing gum formulations in a conventional manner.

Naturally, the preferred chewing gum formulation is a sugarless chewing gum. However, the APM ingredient may also be used in a sugar chewing gum to intensify and/or extend the sweetness thereof. The APM ingredient may be used in either regular chewing gum or bubble gum.

In general, a chewing gum composition typically comprises a water soluble bulk portion and a water insoluble chewable gum base portion and, typically water insoluble flavoring agents. The water soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer, styrene butadiene rubber as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention the insoluble gum base constitutes between about 5 to about 95 percent by weight of the gum. More preferably the insoluble gum base comprises between 10 and 50 percent by weight of the gum and most preferably about 20 to about 35 percent by weight of the gum.

The gum base typically also includes a filler component. The filler component such as calcium carbonate, magnesium carbonate, talc, dicalcium phosphate and the like. The filler may constitute between about 5 to about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water soluble portion of the chewing gum may further comprises softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

As mentioned above, the APM ingredient of the present invention will most likely be used in sugarless gum formulations. However, formulations containing sugar are also within the scope of the invention. Sugar sweeteners generally include saccharide containing components commonly known in the chewing gum art which comprise but are not limited to sucrose, dextrose, maltose, dextrin, dried invert sugar, fructose, levulose, galactose, corn syrup solids, and the like, alone or in any combination.

The APM ingredients of the present invention can also be used in combination with other sugarless sweeteners. Generally sugarless sweeteners include components with sweetening characteristics but are devoid of the commonly known sugars and comprise but are not limited to sugar alcohols such as sorbitol, mannitol, xylitol, hydrogenated starch hydrolysates, maltitol, and the like, alone or in any combination.

Depending on the particular sweetness release profile and shelf-stability needed, the APM ingredients of the present invention can also be used in combination with uncoated APM or with APM coated with other materials and by other techniques. As mentioned above, it is preferable to blend the fast release APM of the present invention with APM treated so as to have a reduced release rate. In this way, the chewing gum will have sufficient up front sweetness along with sufficient extra long lasting sweetness.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including but not limited to oils derived from plants and fruits such as citrus oils, fruit essences, peppermint oil, spearmint oil, clove oil, oil of wintergreen, anise, and the like. Artificial flavoring components are also contemplated. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time along with syrup and a portion of bulking agent. Further portions of the bulking agent may then be added to the mixer. A flavoring agent is typically added with the final portion of the bulking agent. The twice coated sweetener of the present invention is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

EXAMPLES

The following examples are provided by way of explanation and illustration.

COMPARATIVE EXAMPLE 1

Comparative Example 1 was carried out similar to the present invention except that the particles were not comminuted to the specified particle size. That is, Example 1 shows a coarse ground agglomeration. First, 7711 g. of unmilled APM from the G. D. Searle Company was placed in the 40 qt. bowl of a Hobart mixer. 1361 g. of Methocel E4M from the Dow Chemical Co. was also added to the bowl. These two powders were dry blended at the low speed setting on the mixer for approximately 15 minutes. A total of approximately 4880 ml of water was added to this mix. This was accomplished by adding between 200 to 1000 ml of water every 3 to 5 minutes with the mixer running. The damp mix that resulted was dustless and coalesced when squeezed. The damp mix was mixed for about 5 minutes after the last water addition to insure complete interdispersion. The damp mix was transferred to stainless steel trays and spread to a depth of approximately 2 cm. At this point, the material was approximately 34.6 weight percent water, 9.8 weight percent HPMC and 55.6 weight percent APM. The trays were placed in an oven and heated to 170° for 12 to 14 hours. After drying the mix was ground in a Fitzmill at high speed while using a 0.05 inch screen. The water content of the final product was between 2 and 3 weight percent.

Sieve analysis of the product of Example 1 showed the following particle size distribution.

| larger than 0.0331 inches | 3% |
| 0.0331 to 0.0165 inches | 37% |
| 0.0165 to 0.0098 inches | 21% |
| 0.0098 to 0.0059 inches | 15% |
| 0.0059 to 0.0029 inches | 14% |
| smaller than 0.0029 inches | 10% |

EXAMPLE 2

Example 2 is representative of the most preferred embodiment. This Example was performed by taking the product of Example 1 and repeating the grinding process with a 0.027 inch screen.

Sieve analysis of the product of Example 2 gave the following results:

| 20 | larger than 0.0331 inches | 0% by weight |
| 40 | .0331 to 0.0165 inches | 2% by weight |
| 60 | .0165 to 0.0098 inches | 25% by weight |
| 700 | .0098 to 0.0059 inches | 25% by weight |
| 200 | .0059 to 0.0029 inches | 21% by weight |
| pan | smaller than 0.0029 inches | 27% by weight |

EXAMPLE 3

An aqueous solution of zein is prepared from 14.4% dry zein, 77.6% water and about 8% of a 1 M NaOH solution (adjusted to give a pH of 11.8). 6030 g of the product of Example 7 is added to the 40 qt Hobart Mixer and 2970 g of the zein solution is added slowly with the mixer running to give a mixture of damp cohesive particles.

The damp mixture is spread onto drying trays and dried for 12-16 hours at 170° F. The material is then ground using a micropul grinder which is a screw type pulverizer which produces exceedingly fine particle sizes.

Sieve analysis showed a particle size distribution as follows:

| larger than 0.0098 inches | 2% |
| 0.0098 to 0.0059 inches | 6% |
| 0.0059 to 0.0029 inches | 27% |
| smaller than 0.0029 inches | 65% |

COMPARISON

The following comparison was carried out to test the shelf stability and release profile of the APM ingredients produced in Examples 1-3 in chewing gum. This was accomplished by making three batches of chewing gum each of which included the APM ingredients of Examples 1, 2, or 3. In addition, a batch was made with untreated APM. The formulation for the batches was identical except that the level of APM ingredient was adjusted to achieve a calculated level of APM at about 0.3 wt %. The level of sorbitol was also adjusted to account for the differences. The batches of chewing gum had the following formulation:

| INGREDIENT | WT % | | | |
| --- | --- | --- | --- | --- |
| | 1 | 2 | 3 | FREE |
| gum base | 27.0 | | | |
| sorbitol | 40.25 | 40.25 | 40.20 | 40.30 |
| mannitol | 12.0 | | | |
| glycerin | 8.1 | | | |
| 70% sorbitol sln. | 11.0 | | | |
| peppermint oil | 1.3 | | | |
| APM ingredient | 0.35 | 0.35 | 0.40 | 0.30 |

STABILITY

Pieces of chewing gum from the four batches were wrapped in moisture resistant packaging and aged, one set of pieces at 85° F., and the another set of pieces at 73° F. The pieces were analyzed at various time intervals to determine the decomposition rate, i.e. the amount, in weight percent, of undegraded APM remaining in the gum. The results are presented in Table 1 below.

TABLE 1

| | Initial | at 85° F. | | | | at 73° F. | |
| --- | --- | --- | --- | --- | --- | --- | --- |
| | | 4 days | 7 days | 14 days | 21 days | 7 days | 21 days |
| Gum with Example 1 | .27 | .25 | .22 | .23 | .21 | .23 | .25 |
| Gum with Example 2 | .28 | .22 | .21 | .19 | .18 | .22 | .19 |
| Gum with Example 3 | .28 | .21 | .18 | .15 | .14 | .22 | .16 |
| Gum with Free Aspartame | .26 | .18 | .14 | .07 | .05 | .18 | .10 |

As can be seen, the APM ingredients produced in inventive Examples 2 and 3 were nearly as stable as the APM ingredient of comparative Example 1. Also, the APM ingredients of Examples 2 and 3 were much more stable than untreated APM, particularly at 85° F.

RELEASE RATES

Pieces of chewing gum from the four batches were also tested for their APM release rates. This was accomplished by analyzing the level of APM remaining in the pieces after 0, 1, 3, and 6 minutes of chewing. The results are presented in Table 2 below. The numbers in parenthesis represent the weight percent of active APM in the chewing gum after the designated times of chewing. The other numbers represent the amount of APM released from the chewing gum as a percentage of the original level.

TABLE 2

| | Chew time (minutes) | | | |
| --- | --- | --- | --- | --- |
| | 0 | 1 | 3 | 6 |
| Gum with Example 1 | (.23) 0 | (.24) 0 | (.20) 13 | (.18) 22 |
| Gum with Example 2 | (.26) 0 | (.23) 12 | (.20) 23 | (.13) 50 |
| Gum with Example 3 | (.27) 0 | (.22) 19 | (.16) 41 | (.13) 52 |
| Gum with Free APM | (.25) 0 | (.16) 36 | (.09) 64 | (.04) 84 |

As can be seen, the APM ingredients produced in inventive Examples 2 and 3 had significantly faster release rates than the APM ingredient of comparative Example 1, but not quite as fast as the release rate of untreated APM.

In summary, a relatively simple and inexpensive process has been described for producing stable, fast release APM ingredients for chewing gum. Although specific embodiments and examples have been described herein, it should be born in mind that these have been provided by way of explanation and illustration and that the present invention is not limited thereby. Certainly modifications which are within the ordinary skill in the art to make are considered to lie within the scope of the invention as defined by the following claims, including all equivalents.

What is claimed is:

1. A method for producing a chewing gum with fast release, stabilized aspartame comprising the following steps:
    mixing a quantity of uncoated aspartame with a quantity of an agglomerating agent and a quantity of solvent, the quantity of the solvent being limited to that amount sufficient to produce a damp mix which is dust free, non-flowing, and crumbly;
    drying said damp mix;
    comminuting said dried mix to thereby obtain particles of aspartame ingredient essentially having a maximum particle size of 0.017 inches;
    adding said particles of aspartame ingredient to a chewing gum formulation without a further coating.

2. The method of claim 1 wherein said agglomerating agent is selected from the group consisting of modified cellulose, shellac, zein, gelatins, and starches, as well as mixtures thereof.

3. The method of claim 1 wherein said agglomerating agent is added in an amount between about 1 percent and about 65 percent by weight of the agglomerated aspartame.

4. The method of claim 2 wherein said agglomerating agent is hydroxypropyl methylcellulose.

5. The method of claim 4 wherein said hydroxypropyl methylcellulose is added in an amount between about 5 percent and about 50 percent by weight of the agglomerated aspartame.

6. The method of claim 5 wherein the solvent is added in an amount between about 20 and about 55 percent by weight of the damp mix.

7. The method of claim 1 wherein said aspartame particles include a maximum of 2% by weight particles having a particle size of 0.017 inches or larger.

8. The method of claim 1 wherein said particles include a minimum of 20% by weight particles having a particle size of 0.0029 inches or smaller.

9. The method of claim 1 wherein between about 0.02 and about 0.6 weight percent of the agglomerated aspartame is added to the chewing gum formulation.

10. The method of claim 1 wherein between about 0.05 and about 0.3 weight percent of the agglomerated aspartame is added to the chewing gum formulation.

11. A method for producing a chewing gum with fast release, stabilized aspartame comprising the following steps:
    dry blending a quantity of the uncoated aspartame with a quantity of a powdered agglomerating agent;
    gradually adding a limited quantity of solvent to the mixture of aspartame and agglomerating agent, the quantity of the solvent being limited to that amount sufficient to create a damp mix which is dust free, non-flowing, and crumbly;
    drying said damp mix;

comminuting said dried mix to thereby create particles of aspartame ingredient which essentially have a maximum particle size of 0.017 inches; and adding said particles of aspartame ingredient to a chewing gum formulation without a further coating.

12. The method of claim 11 wherein said agglomerating agent is selected from the group consisting of modified cellulose, gums, shellac, zein, maltodextrins, gelatins, starches, and lactose, as well as mixtures thereof.

13. The method of claim 11 wherein said agglomerating agent is added in an amount between about 1 percent and about 65 percent by weight of the agglomerated aspartame.

14. The method of claim 11 wherein said agglomerating agent is hydroxypropyl methylcellulose.

15. The method of claim 14 wherein said hydroxypropyl methylcellulose is added in an amount between about 5 percent and about 50 percent by weight of the agglomerated aspartame.

16. The method of claim 14 wherein the solvent is added in an amount between about 20 and about 55 percent by weight of the damp mix.

17. The method of claim 11 wherein said particles include a maximum of 2% by weight particles having a particle size of 0.017 inches or larger.

18. The method of claim 11 wherein said particles include at least 20% by weight particles having a particle size of 0.0029 inches or smaller.

19. The method of claim 11 wherein between about 0.02 and about 0.6 weight percent of the aspartame ingredient is added to the chewing gum formulation.

20. The method of claim 11 wherein between about 0.05 and about 0.3 weight percent of the aspartame ingredient is added to the chewing gum formulation.

21. A method for producing a chewing gum with fast release, stabilized aspartame comprising the following steps:

dry blending a quantity of uncoated aspartame with a quantity of a powdered modified cellulose;

gradually adding a limited quantity of solvent to the mixture of aspartame and modified cellulose, the quantity of the solvent being limited to that amount sufficient to create a damp mix which is dust free, non-flowing, and crumbly;

drying said damp mix;

comminuting said dried mix to thereby create particles of aspartame ingredient wherein no more than about 5 weight percent of the particles have a particle size greater than 0.017 inches, and wherein at least about 20 weight percent have a particle size of 0.0029 inches or smaller; and adding said particles of aspartame ingredient to a chewing gum formulation without a further coating in an amount between about 0.02 and about 0.6 weight percent of the chewing gum formulation.

* * * * *

UNITED STATES PATENT AND TRADEMARK OFFICE
CERTIFICATE OF CORRECTION

PATENT NO. : 5,221,543
DATED : June 22, 1993
INVENTOR(S) : Steven F. Zibell et al.

It is certified that error appears in the above-identified patent and that said Letters Patent is hereby corrected as shown below:

On the title page, column 1, after "Inventors" delete "Palo Heights" and substitute therefor --Palos Heights--.

On the title page, column 1, after "Assignee" delete "Firma Wilhelm Fette GmbH, Schwarzenbek, Fed. Rep. of Germany" and substitute therefor --Wm. Wrigley Jr. Company, Chicago, IL--.

On the title page under "U.S. PATENT DOCUMENTS", after "4,517,214" delete "Shaaf" and substitute therefor --Shaof--, and after "4,634,593" delete "11/1987" and substitute therefor --1/1987--.

On the title page after "Attorney, Agent, or Firm" delete "Michael J. Striker" and substitute therefor --Willian Brinks Olds Hofer Gilson & Lione--.

In column 2, line 9, after "steps" insert --.--.
In column 2, line 47, after "mixture" insert --.--.
In column 2, line 64, after "chewing" insert --.--.

UNITED STATES PATENT AND TRADEMARK OFFICE
CERTIFICATE OF CORRECTION

PATENT NO. : 5,221,543

DATED : June 22, 1993

INVENTOR(S) : Steven F. Zibell et al.

It is certified that error appears in the above-identified patent and that said Letters Patent is hereby corrected as shown below:

In column 3, line 40, after "sizes" insert --.--.

Signed and Sealed this

Fourteenth Day of June, 1994

Attest:

BRUCE LEHMAN

Attesting Officer

Commissioner of Patents and Trademarks